United States Patent [19]

Lee, Jr. et al.

[11] 4,089,051

[45] May 9, 1978

[54] ALTERNATIVE DIRECT AND INDIRECT ADDRESSING

[75] Inventors: James Patrick Lee, Jr., Matawan; Joseph Anthony Raffa, Union; Frank Peter Sansone, Freehold; Nathan Harold Stochel, Edison, all of N.J.

[73] Assignee: Bell Telephone Laboratories, Incorporated, Murray Hill, N.J.

[21] Appl. No.: 761,525

[22] Filed: Jan. 24, 1977

[51] Int. Cl.[2] ............................................. G06F 3/06
[52] U.S. Cl. ................................................. 364/200
[58] Field of Search ..................................... 364/200

[56] References Cited

U.S. PATENT DOCUMENTS

| | | | |
|---|---|---|---|
| 3,772,656 | 11/1973 | Serracchioli et al. | 340/172.5 |
| 3,919,693 | 11/1975 | Anderson | 340/172.5 |
| 3,984,819 | 10/1976 | Anderson | 340/172.5 |

*Primary Examiner*—Gareth D. Shaw
*Assistant Examiner*—C. T. Bartz

*Attorney, Agent, or Firm*—R. C. Lipton; Charles S. Phelan

[57] ABSTRACT

Units peripheral to a data processor and individually selectable by unique address signals to perform functions are arranged in sets providing functions of hard wired apparatus such as data modems, units in each set providing functions identical to corresponding units in other sets. The performance of the functions is controlled by a memory unit which designates which modem set is to be selected and by a common program routine which instructs the processor to apply, to an address bus, address codes defining corresponding units without specifying the individual unit. A logic circuit converts the address codes to the unique address signals of the corresponding unit in the designated modem set. At the end of the routine the processor changes the designation in the memory unit to another modem set. An interrupt routine instructs the processor to directly access individual units by applying, to the address bus, address codes defining individual units, which address codes are converted to the unique address signals of the defined individual units.

4 Claims, 3 Drawing Figures

ALTERNATIVE DIRECT AND INDIRECT ADDRESSING

FIELD OF THE INVENTION

This invention relates to data processing systems and, more particularly, to methods of addressing units peripheral to the data processor.

DESCRIPTION OF THE PRIOR ART

In data processing systems, units external to the data processor are conventional selected by the processor and instructed to perform various functions. Selection is typically accomplished by the application of address code signals to a common address bus, each unique address code being individual to an external unit. A set of such units, in conjunction with a data processor controlled by an appropriate program routine, could thereby perform the same sequence of functions performed by hard wired apparatus such as but not restricted to, a data modulator/demodulator (modem).

It is apparent that the data processor could accommodate a plurality of modems by utilizing a plurality of sets of units. However, although units in each set provide the same function as corresponding units in the other sets, a separate program routine is normally provided for each modem since each of the several units in each set has its own unique address.

It is an object of this invention to use a single common routine for providing common functions.

A known approach for using a single common routine is to assign a common unit to perform each of the common functions. When these common functions are to be performed by any modem, the data processor can call on a subroutine which is available to all the modems. This approach, however, is not effective for certain units, such as input/output units, which must be individual to the input/output ports of each apparatus, precluding their use, in common, for more than one apparatus.

Another approach for using a single common routine is to assign the same address to units, in the several sets of units, which provide the same function and extend a separate busing system to each set of units. By designating which apparatus set is to function, logical gate circuitry can extend the common bus to a selected one of the separate busing systems. Since the unit addresses are the same for corresponding units, in the several sets, having the same function, a single common routine may be used for different apparatus.

In certain situations, such as processing of incoming signals, apparatus units providing the signal processing functions must be accessed in real time. This is customarily done by an interrupt routine which, when the signal is detected, interrupts the routine presently running and then instructs the processor to directly address the unit providing the processing function. However, in the common address approach, corresponding units in the several sets have the same address, whereas those units which must be accessed in real time have to have their own unique address.

It is another object of this invention to use a single common routine for units having their own unique address.

SUMMARY OF THE INVENTION

In accordance with this invention, any one of the sets of units may be designated to perform the functions and an address code defining an individual unit or alternatively, an address code defining corresponding units may be applied to the address bus. The address code defining the individual unit is converted to the unique address signals that select the individual unit. The address code defining the corresponding units is converted to the unique address signals that select the corresponding unit in the designated set of units. A single common routine, wherein corresponding units are defined without identifying the individual unit, may thus be employed in a system wherein each unit is individual to each modem and has its own unique address. Moreover, an interrupt routine, wherein individual units are defined, may also be employed.

In accordance with a feature of this invention, the address code converter is rendered responsive to the set of units designation when address codes defining corresponding units are applied to the address bus.

In accordance with another feature of this invention, the set of units designation is periodically modified to designate another one of the sets of units. The modification of the designation advantageously takes place upon the completion of the common routine wherein corresponding units are defined.

The foregoing and other objects and features of this invention will be more fully understood from the following description of an illustrative embodiment taken in conjunction with the accompanying drawings.

DETAILED DESCRIPTION

Figure 1:
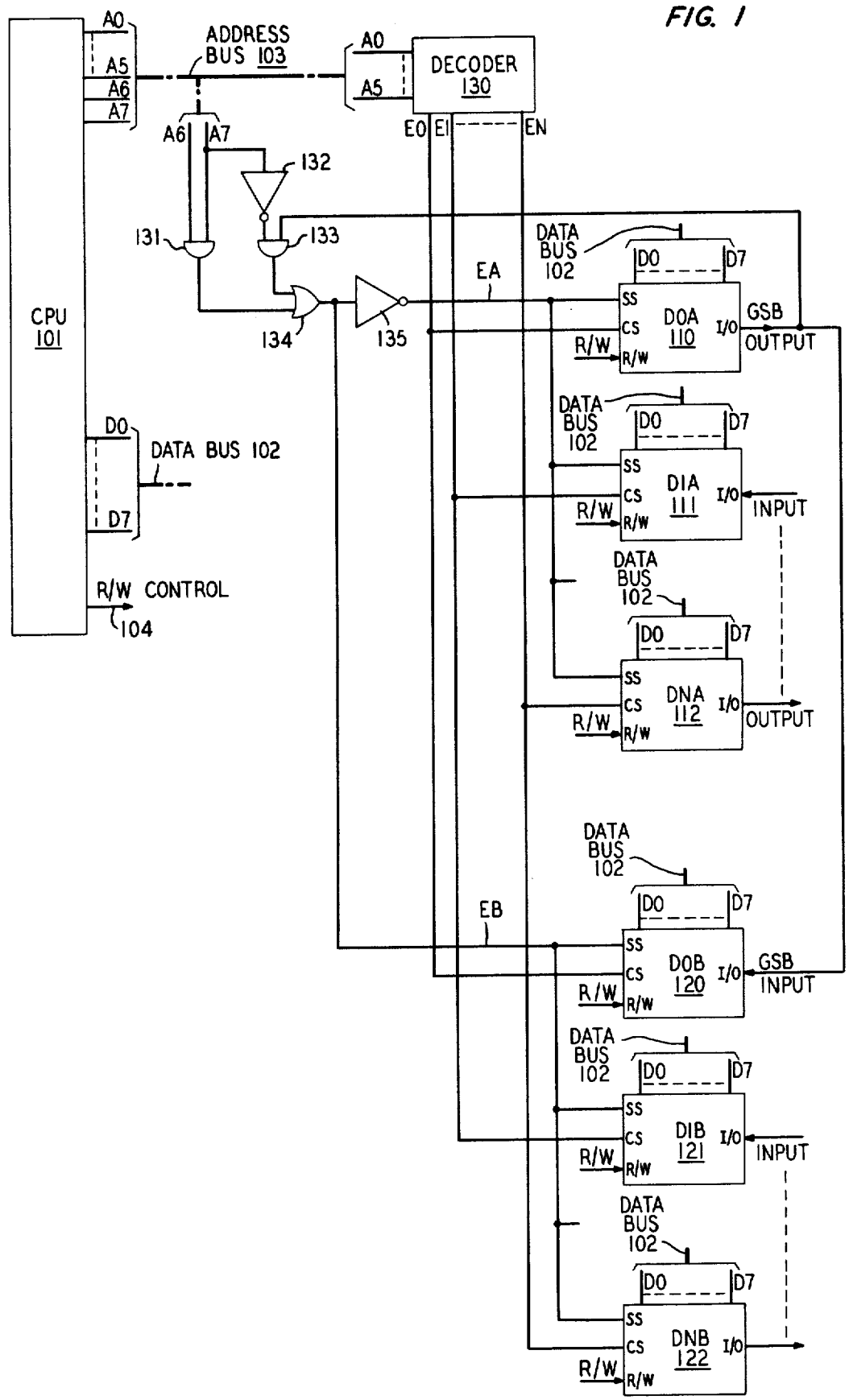
FIG. 1 shows, in schematic form, the circuitry and apparatus which form a data processing system in accordance with the invention.

The control of unit selection in accordance with the present invention is provided by program controlled data processor 101 shown in FIG. 1. Data processor 101 is conventionally controlled by program routines, as is well known in the art, to provide a sequence of steps which include selection of peripheral units, such as units 110 to 112 and 120 to 122, and writing data into or reading data out of these selected units. In affecting this selection for the read or write function, data processor 101 applies appropriate address code signals to leads A0 through A7, which leads comprise common address bus 103. At the same time, an appropriate read/write signal is applied by data processor 101 to read/write control lead 104 to request the read or write function.

In the event that a read function is called for by the routine, the peripheral unit selected by the address code signals, as further described hereinafter, applied data signals to output leads thereof, which output leads extend by way of common data bus 102 to data leads D0 through D7 and which data leads, as can be seen in FIG. 1, extend to data processor 101. Alternatively, if a write function is called for in the program routine, data processor 101 applies appropriate data signals to leads D0 through D7 and these signals are applied by way of data bus 102 to the selected peripheral unit and are thereupon written into the selected peripheral unit, as described further hereinafter.

The peripheral units are divided into two sets, one set generally designated as Set A and comprising N units shown as units D0A through DNA, and the other set generally designated as Set B and comprising N similar units D0B through DNB. As seen in FIG. 1, unit D0A is identified as block 110, unit D1A is identified as block 111 and unit DNA is identified as block 112. Similarly in Set B, units D0B, D1B and DNB and identified as blocks 120, 121 and 122, respectively.

D0A unit 110 may represent an address or storage location in a random access memory. In accordance with this representation, D0A unit 110 functions, when selected by appropriate address signals on input terminals SS and CS and energized by a write signal on input terminal R/W, to store therein data received from data processor 101 via data bus 102 and data on leads D0 through D7. In accordance with this specification, an important D0A unit 110 function involves the storage of a single bit of information, hereinafter referred to as the gear shift bit. D0A unit 110 also applies to output terminal I/O, a signal which identifies the condition of the stored gear shift bit. Thus, data processor 101 will periodically, in accordance with a routine in its stored program, write a "0" or "1" gear shift bit into D0A unit 110 and the unit, in turn, will apply a corresponding signal bit to output terminal I/O.

D0B unit 120 may represent a random access memory location address and/or a buffer location or address which stores information received at terminal I/O. When appropriate selection signals are applied to input terminals SS and CS of D0B unit 120 and a read signal is applied to terminal R/W, the unit passes the stored information to leads D0 through D7 and thus to data processor 101 by way of data bus 102.

D1A unit 111 may represent an input unit that accepts incoming data at terminal I/O and buffers the data therein. The application of appropriate selection signals to terminals SS and CS and the application of a read signal to terminal R/W enables unit 111 to pass data signals (corresponding to the incoming data signals or translations thereof) to leads D0 through D7 and thus back to processor 101 by way of data bus 102. D1B unit 121 (in Set B) is arranged and functions in the same manner as D1A unit 111 and therefore constitutes an input unit in Set B corresponding to D1A unit 111 in Set A.

DNA unit 112 may comprise an output unit which, when appropriate selection signals are applied to terminals SS and CS and a write signal is applied to write terminal R/W, writes therein the data information on leads D0 through D7 of data bus 102. Information (corresponding to the information stored in the unit or translations thereof) is passed to output terminal I/O. DNB unit 122 is arranged and functions in the same manner as DNA unit 112 and therefore constitutes an output unit in Set B which corresponds to DNA unit 112 in Set A.

Units D1A through DNA may constitute circuit chips or portions thereof that advantageously provide the various functions of a modem. For example, input unit 111 might translate incoming line signals to digital signals appropriate for processing in data processor 101 and output unit 112 may convert processed data signals from data processor 101 to output line signals. The corresponding units in Set B may advantageously provide the same functions appropriate for a separate and independent modem.

Common address bus 103 constitutes leads A0 through A7. Address leads A0 through A5 extend to decoder 130. Decoder 130 provides the conventional function of decoding the address signals on the address leads A0 through A5 and energizing one of a plurality of output leads E0 through EN. With six input address leads, the maximum number of output leads E0 to EN are $2^6$ or 64.

Output lead E0 extends to the CS input terminals of units 110 and 120. Output lead E1 extends to the CS input terminals of units 111 and 121. Similarly, each of the other output leads of decoder 130 extend to the CS input terminals of one unit in Set A and the corresponding one of the units in Set B which provides the same function.

Address leads A6 and A7 extend by way of address bus 103 to gate 131. Lead A7 additionally extends to inverter 132. Gate 131 and inverter 132 together with AND gate 133, OR gate 134 and inverter 135 constitute a translator which examines the address bits on leads A6 and A7 together with the gear shift bit output of D0A unit 110 to provide select signals on leads EA and EB. Lead EA applies its select signals to the SS input terminals of all the units in Set A and lead EB applies its select signals to the SS input terminals of all of the units in Set B.

The various address signals which are advantageously generated by data processor 101 to select the various circuit chips are listed in the Table below:

|  | DIRECT ADDRESS | INDIRECT ADDRESS |
| --- | --- | --- |
| D0A | 10 000 000 | N/A |
| D1A | 10 000 001 | (D1) 0X 000 001 |
| DNA | 10 111 111 | (DN) 0X 111 111 |
| D0B | 11 000 000 | N/A |
| D1B | 11 000 001 | (D1) 0X 000 001 |
| DNB | 11 111 111 | (DN) 0X 111 111 |

The addresses in the Table are shown with the most significant bit first and the least significant bit last; that is, the first bit comprises the bit on address lead A7 and the last bit comprises the bit on lead A0. The left-hand column of addresses in the Table defines the direct address for each of the units which are identified to the left of each of the addresses in the column. It is thus noted that when the data processor is directly addressing a peripheral unit, each unit is identified by its own address different from the address of any other unit. In addition, all direct addresses are characterized by a "1" bit in the most significant bit position A7, which identifies the address as a direct address. It is to be further noted that all addresses for Set A have a "0" bit in bit position A6 and all unit addresses for Set B have a "1" bit in bit position A6.

The right-hand column of addresses comprises the indirect addresses which define corresponding units in Set A and Set B. In accordance with the Table, D0A unit 110 and D0B unit 120 do not necessarily have an indirect address. It is to be noted that D1A unit 111 and D1B unit 121 have the same indirect address; as does each pair of corresponding units which provide the same function. Data processor 101, by indirect addressing, therefore selects a unit in Set A and a corresponding unit in Set B having an identical function without specifying which of the corresponding units are to be selected. This has the advantage, as more fully described hereinafter, of providing a common program routine for both of the modems, since the specific modem performing the routine and the specific address thereof need not be identified by the data processor. It is to be additionally noted that the most significant bit A7 in the indirect address is always a "0" bit, and A6 is not used.

Assume now that, as part of a step in a routine, data processor 101 directly addresses a peripheral unit. A "1" bit is therefore applied to address lead A7. This enables AND gate 131 and the inversion thereof via inverter 132 disables AND gate 133. If the unit to be selected is in Set A, the sixth bit on lead A7 is a "0" bit. The "0" bit is passed through AND gate 131 and OR gate 134 to lead EB. Lead EB extends to the SS terminals of all of the units in Set B and none of these units are selected since a "0" bit is applied to lead EB.

The "0" bit at the output of OR gate 134 is inverted by inverter 135, applying a "1" bit to lead EA which, in turn, extends to the SS input terminals of all of the units of Set A, thus partially selecting all of the units. Decoder 130 at the same time decodes the bits on leads A0 through A5 energizing one of output leads E0 through EN. The energized one of these leads thereby fully selects the appropriate unit in Set A.

If the data processor desires to directly select a unit in Set B, "1" bits are applied to address leads A6 and A7. The "1" bit on lead A6 is passed through enabled gate 131 and OR gate 134 to lead EB to partially select all the Set B units. The energized output lead of decoder 130 then fully selects the appropriate unit in Set B.

If, in a program step, the data processor is instructed to select corresponding units performing the same function without designating the particular set or modem, data processor 101 applies appropriate "bits" designating the corresponding units to address leads A0 to A5 and applies a "0" bit to address lead A7. This "0" bit disables AND gate 131 and enables AND gate 133. The gear shift bit stored in D0A unit 110 is thereupon passed through gate 133 and OR gate 134 to lead EB and an inversion thereof is passed by way of inverter 135 to lead EA. Thus, a "1" bit stored in D0A unit 110 partially selects the units in Set B and, alternatively, a "0" gear shift bit stored in D0A unit 110 partially selects the units in Set A. Accordingly, the data processor is enabled to perform a routine including steps wherein units perform functions without designating the specific modem which is to perform the functions thereof.

Figure 2:
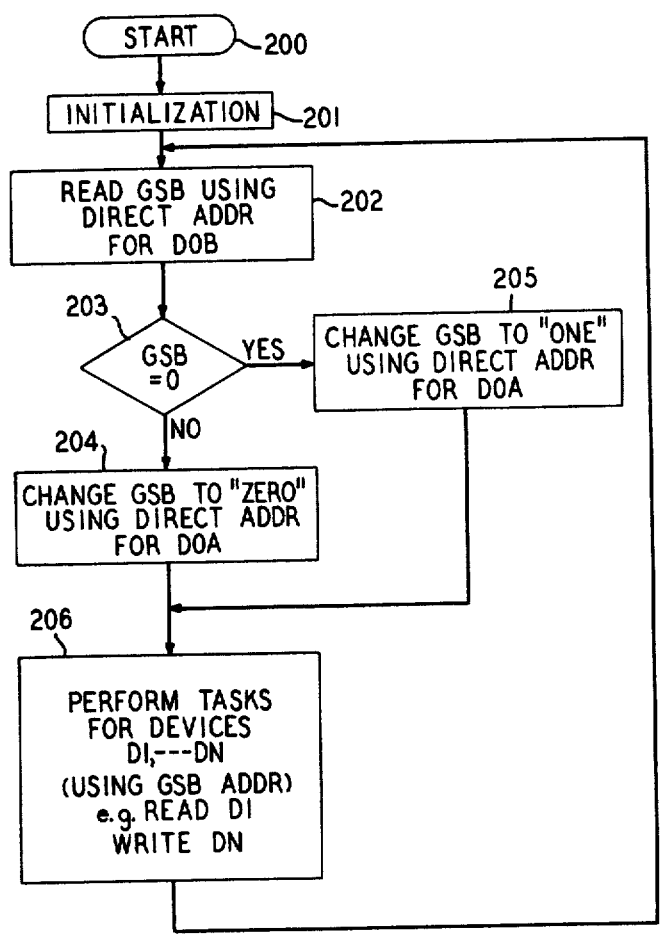
FIG. 2 depicts a flow chart of an algorithm for a common routine suitable for the data processing system.
Figure 3:
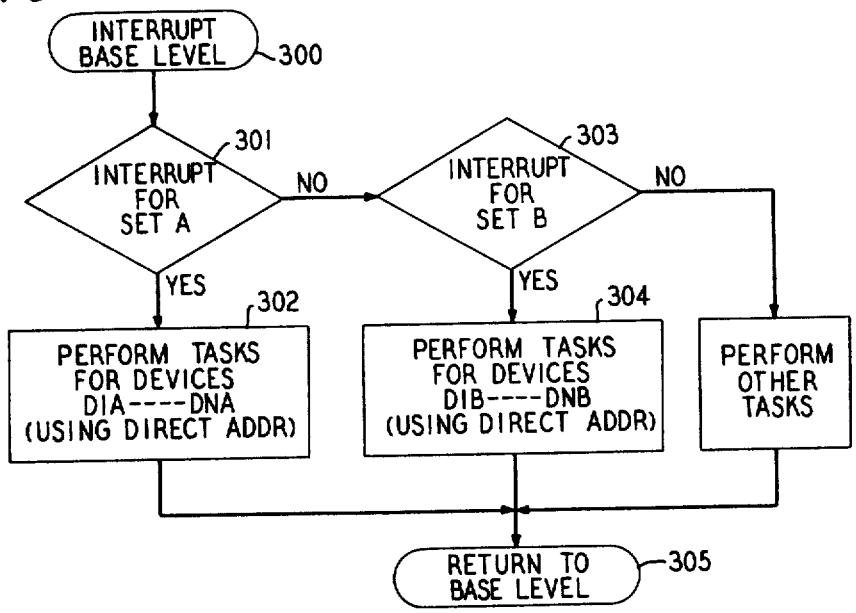
FIG. 3 discloses a flow chart of an algorithm for an interrupt routine suitable for the data processing system.

FIGS. 2 and 3 show general algorithms which may be used by the data processor to achieve the advantage of the direct and indirect addressing. As is conventional in data processing algorithms, after the initiation or start thereof, generally indicated by start 200, the program proceeds to initialization action 201. In this action, as is well known in the art, the various suitable parameters are set up for the program functions.

In accordance with this invention, after the parameters are set up and the initialization is complete, the program proceeds to action 202. At this time, data processor 101 applies to address bus 103 the direct address for D0B unit 120, which as can be seen by the Table previously described, is an eight bit address having "1" bits on A7 and A6 and "0" bits elsewhere. A "1" bit is therefore applied to lead EB and decoder 130 applies a "1" bit to lead E0 thereby providing the unique selection signals for D0B unit 120. D0B unit 120 is therefore selected and, in response to a read signal on lead 104, unit 120 applies to data bus 102 the stored gear shift bit which D0B unit 120 previously derived from the output of D0A unit 110. The program thereupon proceeds to decision 203 and then to action 204 if the gear shift bit applied by unit 120 to data bus 102 is a "1" bit and alternatively to action 205 if the gear shift bit is a "0" bit.

Assume the gear shift bit on the data bus is a "1" bit. In accordance with the routine in action 204, data processor 101 changes the gear shift bit to a "0" bit using the direct address for D0A unit 110. Since, as can be seen from the above Table, the seventh bit of the address is a "1" bit and the sixth bit is a "0" bit, a "1" bit is applied to lead EA. Decoder 130 concurrently applies a "1" bit to lead E0 and the unique address signals are thus produced to select D0A unit 110. Data processor 101 at the same time passes a write signal via lead 104 to the unit and applies an instruction to change the gear shift bit to a "0" bit to data bus 102. The gear shift bit stored by unit 110 is accordingly changed to a "0" bit and this information is passed by way of the output of D0A unit 110 to the input of D0B unit 120. If the gear shift bit was a "0" bit and the program had proceeded to action 205, the routine would be the same with the exception that an instruction to change the bit to a "1" bit is applied to data bus 102. In either event the program proceeds to action 206.

Action 206 includes routines for controlling the various functions of units which make up a modem, which functions are well known in the art. Typical functions with respect to the peripheral units, as shown in action 206, include reading information in the D1 unit and writing information into the DN unit, which functions constitute typical parts of the routine. In action 206, the indirect address is used to select the units and data processor 101 therefore applies a "0" bit to address lead A7 when a selection is called for by the program routine. Accordingly, one set of units (Set A or Set B) is partially selected by the energization of all of the input terminals SS of the units depending on whether the gear shift bit is a "1" bit or a "0" bit, as previously described. Thus, this action 206 uses routines common to both modems, the common routines defining various actions of a modem without specifying which modem, Set A or Set B, is to provide the actions. The gear shift bit concurrently designates which modem is to perform the functions and the unit selected constitutes that unit, in the set designated by the gear shift bit, whose input terminal CS is energized by decoder 130.

At various points during action 206, it may be necessary to interrupt a routine. One typical example may be where a modem receives an incoming signal, which information must be acted upon immediately. In this event, the base level routine is interrupted, as indicated by interrupt 300 in FIG. 3, and the program proceeds to decision 301. If the signal was received by a Set A input unit such as D1A unit 111, the program proceeds to action 302. If, however, the signal was received by D1B unit 121, decision 301 instructs the program to proceed to decision 303, which then instructs the program to go to action 304. In certain instances, an interruption routine is started without a signal being received. In this event, decision 303 instructs the program to perform other required tasks and then to return to the base level at point 305.

If the program proceeded to action 302, a typical routine may involve reading the information in D1A unit 111 and perhaps writing information into DNA unit 112. These functions are similar to the corresponding functions provided during action 206 with the exception that data processor 101 uses the direct address to select the peripheral units. In this event, as previously described, a "1" bit is applied to address lead A7 to enable AND gate 131 and disable AND gate 133 and a "0" bit is applied to address lead A6. Consequently, a "1" bit is applied to lead EA and thus the Set A modem performs the functions and processor 101 thereby directly controls the selection of the Set A peripheral units. At the termination of action 302, the program returns to the base level routine in action 305.

Similarly, if the program had proceeded to action 304, processor 101 applies "1" bits to address leads A6 and A7, and the various functions would be provided by the units in Set B with processor 101 using the direct address. Similarly, after action 304, the program returns to the base level routine.

Although a specific embodiment of this invention has been shown and described, it will be understood that various modifications may be made without departing from the spirit of this invention.

We claim:

1. A system for individually addressing more than one identical sets of units and the units within said sets, said units being for performing functions peripheral to a central processor, said system including:

means for individually selecting any one of said sets of units responsive to a first part of a multibit code on an address bus of said central processor;

means for decoding a second part of said code on said address bus to designate any one of said units contained within all of said sets;

means for storing within a unit of each set a code for selectably addressing only one of said sets at a given time; and means responsive to said first part of said address code for choosing between set selection by either said selecting means or said storing means, wherein said central processor is required to store only one group of said decoding means second part input addresses for addressing all of said units.

2. The system of claim 1 wherein each of said units is connected for communication with said central processor by means of a common data bus as determined by said address codes and said choosing means for cooperating via said data bus with said central processor and with said storing means to individually address all of said units in a predetermined recurring sequence of sets and units within each set.

3. The system of claim 1 wherein at least one of said units in each of said sets is capable of receiving external information signals, and, when addressed, coupling said signals to said central processor.

4. The system of claim 1 wherein at least one of said units in each of said sets is capable, when addressed, of receiving a signal from the central processor and transmitting said signal externally from said system.

* * * * *